(12) United States Patent
Takahashi et al.

(10) Patent No.: US 10,996,539 B2
(45) Date of Patent: May 4, 2021

(54) ELECTRO-OPTIC MODULATOR

(71) Applicants: NEC CORPORATION, Tokyo (JP); PHOTONICS ELECTRONICS TECHNOLOGY RESEARCH ASSOCIATION, Tokyo (JP)

(72) Inventors: Shigeki Takahashi, Tokyo (JP); Junichi Fujikata, Tokyo (JP)

(73) Assignees: NEC CORPORATION, Tokyo (JP); PHOTONICS ELECTRONICS TECHNOLOGY RESEARCH ASSOCIATION, Tokyo (JP)

( * ) Notice: Subject to any disclaimer, the term of this patent is extended or adjusted under 35 U.S.C. 154(b) by 0 days.

(21) Appl. No.: 16/440,407

(22) Filed: Jun. 13, 2019

(65) Prior Publication Data
US 2019/0384135 A1    Dec. 19, 2019

(30) Foreign Application Priority Data
Jun. 14, 2018 (JP) ............................. JP2018-113707

(51) Int. Cl.
*G02F 1/225* (2006.01)
*G02F 1/21* (2006.01)

(52) U.S. Cl.
CPC ...... *G02F 1/2257* (2013.01); *G02F 2001/212* (2013.01); *G02F 2201/063* (2013.01)

(58) Field of Classification Search
CPC ............. G02F 1/2257; G02F 2001/212; G02F 2201/063
USPC ........................................................... 385/3
See application file for complete search history.

(56) References Cited

U.S. PATENT DOCUMENTS

| | | | | |
|---|---|---|---|---|
| 4,082,419 A | * | 4/1978 | Thompson | G02F 1/3133 385/130 |
| 4,786,128 A | * | 11/1988 | Birnbach | G02F 1/19 359/245 |
| 2011/0211786 A1 | | 9/2011 | Ushida et al. | |
| 2012/0257850 A1 | | 10/2012 | Fujikata et al. | |

(Continued)

FOREIGN PATENT DOCUMENTS

WO    2004088394 A2    10/2004

*Primary Examiner* — Jerry M Blevins
(74) *Attorney, Agent, or Firm* — Sughrue Mion, PLLC (57) ABSTRACT

Provided is a SIS-type electro-optic modulator capable of realizing highly efficient optical coupling with a rib-type Si waveguide, improving modulation efficiency, realizing reduction of electric capacity and lead-out resistance in stacked semiconductor layers. The modulator includes a SIS junction constituted by first and second semiconductor layers having different type of conductivity and a dielectric layer interposed therebetween, wherein an electrical signal from electrodes coupled to the first and second semiconductor layers causes free carriers accumulate, deplete or invert on both sides of the dielectric layer, thereby modulating a free carrier concentration felt by an optical signal electric filed, light having a polarization component orthogonal to the width direction of the SIS junction is incident on the dielectric layer, and the width of the SIS junction is $\lambda/n_{eff}$ or less ($\lambda$ is the wavelength of the incident light and $n_{eff}$ is an effective refractive index of the modulator to the incident light).

16 Claims, 8 Drawing Sheets

(56) References Cited

U.S. PATENT DOCUMENTS

| | | | |
|---|---|---|---|
| 2015/0110438 A1* | 4/2015 | Iwamoto | G01C 19/64 |
| | | | 385/3 |
| 2016/0291350 A1* | 10/2016 | Fujikata | G02F 1/025 |
| 2016/0380121 A1* | 12/2016 | Suzuki | H01L 31/028 |
| | | | 385/2 |
| 2018/0074349 A1 | 3/2018 | Fujikata et al. | |
| 2018/0246350 A1* | 8/2018 | Ma | G02F 1/0018 |

* cited by examiner

ELECTRO-OPTIC MODULATOR

INCORPORATION BY REFERENCE

This application is based upon and claims the benefit of priority from Japanese patent application No. 2018-113707, filed on Jun. 14, 2018, the disclosure of which is incorporated herein in its entirety by reference.

TECHNICAL FIELD

The present invention relates to an electro-optic modulator for high speed conversion of high speed electrical signals into optical signals that is required in the information processing and telecommunications fields.

BACKGROUND ART

Optical communication devices using silicon photonics and functioning at 1310 and 1550 nm fiber-optic communication wavelengths for a variety of systems such as for fiber-to-the-home and local area networks (LANs) are highly promising technologies which enable integration of optical functioning elements and electronic circuits together on a silicon platform by means of CMOS technologies.

In recent years, silicon-based passive optical devices such as waveguides, couplers and wavelength filters have been studied very extensively. Important technologies for manipulating optical signals for such communication systems include silicon-based active devices such as electro-optic modulators and optical switches, which also have been attracting much attention. However, optical switches and optical modulators that use a thermo-optic effect of silicon to change the refractive index operate at low speed, and accordingly their use is limited to cases of device speeds corresponding to modulation frequencies not higher than 1 Mb/second. Accordingly, in order to realize a high modulation frequency demanded in a larger number of optical communication systems, electro-optic modulators using an electro-optic effect are required.

Most of the electro-optic modulators proposed to date are devices which use a carrier plasma effect to change the free carrier density in a silicon layer and thereby change the real and imaginary parts of the refractive index, thus changing the phase and intensity of light. Such wide use of the above-mentioned carrier plasma effect is because of the fact that pure silicon does not exhibit a linear electro-optic effect (the Pockels effect) and that a change in its refractive index due to the Franz-Keldysh effect or the Kerr effect is very small. In modulators using free carrier absorption, the output light is directly modulated through a change in the absorption rate of light propagating in Si. As a structure using such changes in the refractive index, one employing a Mach-Zehnder interferometer is generally used, where intensity modulated optical signals can be obtained by causing optical phase differences in the two arms that include a phase modulating portion to interfere with each other.

Free carrier density in the electro-optical modulators can be varied by injection, accumulation, depletion or inversion of free carriers. Most of such devices that have been studied to date have low optical modulation efficiency, and accordingly, for optical phase modulation, require a length on the order of millimeters and an injection current density higher than 1 kA/cm$^3$. In order to realize size reduction, higher integration and also a reduction in power consumption, a device structure giving high optical modulation efficiency is required, and if it is achieved, a reduction in the optical phase modulation length becomes possible. If the device size is large, the device becomes susceptible to the influence of temperature distribution over the silicon platform, and it is therefore assumed that a change in the refractive index of the silicon layer caused by a thermo-optic effect due to the temperature distribution cancels out the essentially existing electro-optic effect, thus raising a problem.

Figure 1:
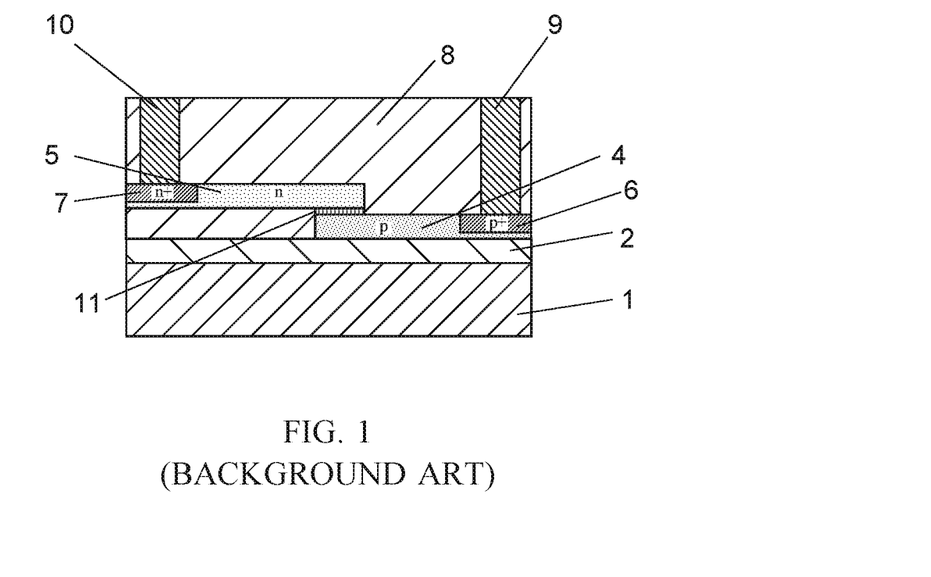
FIG. 1 is a cross-sectional view of an electro-optic modulator including an SIS structure according to one background art.

FIG. 1 illustrates a silicon-based electro-optic modulator having an SIS (silicon-insulator-silicon) structure according to WO2004/088394 A1. WO2004/088394 A1 proposes a silicon-based electro-optic modulator including a p-Si 4 second conductive type body region and an n-Si 5 first conductive type gate region stacked on the second conductive type body region so as to partially overlap the second conductive type body region in which relatively thin dielectric layer 11 is formed on this stack interface. Such a silicon-based electro-optic modulator is formed on an SOI platform (Si supporting substrate 1 and BOX layer 2), the body region is formed on a relatively thin silicon surface layer of the SOI substrate and the gate region is made up of a relatively thin silicon layer stacked on the SOI structure. The interiors of the gate and the body regions are doped and the doped regions are defined so that variations in carrier density are controlled by an external signal voltage. In this case, ideally, it is desirable to make an optical signal electric field coincide with the region where the carrier density is externally and dynamically controlled, in which situation optical phase modulation can be performed by accumulating, depleting or inverting free carriers on each side of dielectric layer 11. However, in practice there is a problem in that the region where the carrier density dynamically changes is an extremely thin region with a size of about several tens of nanometers, which results in the problem that an optical modulation length on the order of millimeters is required, and the electro-optic modulator accordingly becomes large in size, and consequently high-speed operation is difficult.

Figure 2:
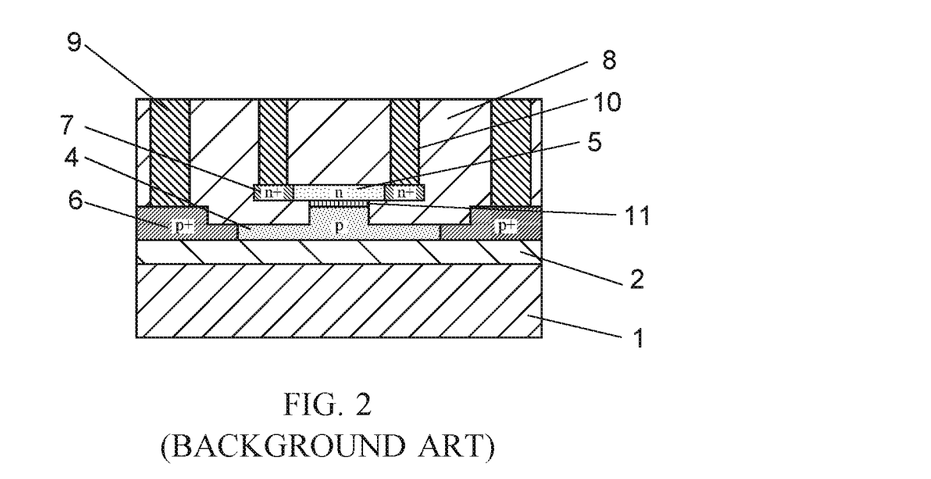
FIG. 2 is a cross-sectional view of an electro-optic modulator including an SIS structure according to another background art.

US2011/211786 A1 also discloses a silicon-based electro-optic device. As shown in FIG. 2, in this device, a stack structure including a first silicon layer 4 of a first conductivity type and a second silicon layer 5 of a second conductivity type has a rib waveguide shape so as to form an optical confinement area, and a slab portion of a rib waveguide includes an area (6 and 7) to which metal electrode (9 and 10) is connected. The slab portion in the area to which the metal electrode is connected is thicker than a surrounding slab portion. The area to which the metal electrode is connected is set so that a range of a distance from the rib waveguide to the area to which the metal electrode is connected is such that when the distance is changed, an effective refractive index of the rib waveguide in a zeroth-order mode does not change. In this case, it is necessary to separate the electrode layer adjacent to the first silicon layer 4 of a first conductivity type and the second silicon layer 5 of a second conductivity type so that the electrode layer formed adjacent to the silicon layer does not interfere. As a result, there may be where the resistance leading out to the electrode layer from the silicon layer of the first conductivity type became high. On the other hand, when the electrode layer formed adjacent to the second silicon layer of the second conductivity type is brought close to the rib waveguide, the optical loss becomes large.

Therefore, with regard to the SIS-type electro-optic modulator that can be downsized and lowered in voltage, it is an issue to improve the modulation efficiency and reduce the power consumption and the frequency band by reducing the electric capacity.

SUMMARY

It is an object of the present invention to provide a SIS-type electro-optic modulator capable of realizing highly efficient optical coupling with a rib-type Si waveguide, improving modulation efficiency, realizing reduction of electric capacity and lead-out resistance in stacked semiconductor layers.

One aspect of the present invention relates to an electro-optic modulator including a first semiconductor layer doped to exhibit a first type of conductivity; a second semiconductor layer doped to exhibit a second type of conductivity, at least part of the second semiconductor layer being stacked over the first semiconductor layer; and a dielectric layer disposed in the interface between the stacked semiconductor layers to form a SIS (semiconductor-insulator-semiconductor) junction, wherein an electrical signal from electrodes coupled to the first and second semiconductor layers causes free carriers accumulate, deplete or invert on both sides of the dielectric layer in the SIS junction, thereby modulating a free carrier concentration felt by an optical signal electric filed, wherein light having a polarization component orthogonal to the width direction of the SIS junction is incident on the dielectric layer, and wherein the width of the SIS junction is $\lambda/n_{eff}$ or less, where $\lambda$ is the wavelength of the light incident of the dielectric layer and $n_{eff}$ is an effective refractive index of the electro-optic modulator to the light incident on the dielectric layer.

According to one aspect of the present invention, it is possible to provide an SIS type electro-optic modulator capable of realizing highly efficient optical coupling with a rib-type Si waveguide, improving modulation efficiency, realizing reduction of electric capacity and lead-out resistance in stacked semiconductor layers, and capable of integration on the Si substrate.

EXAMPLE EMBODIMENT

Hereinafter, the present invention will be described with example embodiments.

Figure 3:
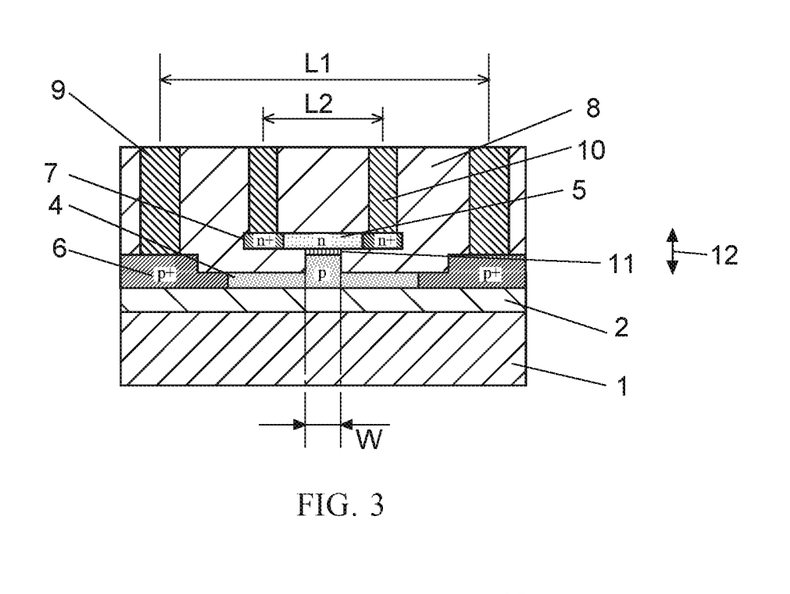
FIG. 3 is a cross-sectional view of an electro-optic modulator including an SIS structure according to one example embodiment of the present invention.

FIG. 3 is a cross-sectional view of an electro-optic modulator including an SIS structure according to one example embodiment of the present invention. Here, the first conductivity type is described as p-type and the second conductivity type is described as n-type, but conversely, the first conductivity type may be n-type and the second conductivity type may be p-type.

In FIG. 3, a first semiconductor layer 4 doped to exhibit a first type of conductivity (p-type conductivity) and a second semiconductor layer 5 doped to exhibit a second type of conductivity (n-type conductivity) are disposed parallel to support substrate 1 of an SOI substrate via buried oxide (BOX) layer 2 which constitutes a lower clad, and both semiconductor layers are at least partially stacked. Between the stacked semiconductor layers, a dielectric layer 11 is disposed to form SIS type junction. In FIG. 3, the first semiconductor layer is formed into a rib waveguide structure, the dielectric layer 11 is formed on the rib waveguide structure and the second semiconductor layer 5 is stacked thereon. In addition, slab regions are formed on both sides of the rib waveguide structure of the first semiconductor layer 4, and a first contact region 6 doped to the first type of conductivity (p+) at high concentration is provided in a part of the slab region and a region formed at the same height as the rib waveguide structure. The support substrate 1 and the BOX layer 2 of the SOI substrate may be simply referred to as a substrate.

Since the highly doped first contact region having same height to the rib waveguide is formed adjacent to the first semiconductor layer 4, it is possible to reduce the electrode lead-out resistance, i.e., series resistance component with RC time constant. Further, by controlling the thickness of the second semiconductor layer 5, the overlap between the light field and the region where the carrier density is modulated is improved, and the electro-optic modulator can be miniaturized.

It is not necessary to form the first contact region 6 in the same height to the rib waveguide, and a part of the first semiconductor layer 4 having the slab height can be doped with high concentration to form the first contact region 6. In this example embodiment, a direction of the SIS junction width is oriented in the direction parallel to the substrate surface, i.e., the structure that the first semiconductor layer 4, the dielectric layer 11 and the second semiconductor layer 5 are stacked on the substrate, but is not limited to this. The direction of the SIS junction width may be oriented in the direction perpendicular to the substrate surface. In consideration of simultaneously forming an optical mode converter, described later, on the same substrate, the direction of the SIS junction width is oriented parallel to the substrate surface, and it is preferable to form the first semiconductor layer 4 into a rib waveguide structure.

At this time, in order to reduce the light absorption loss due to the overlap between the region where the doping density is increased and the optical field, in the present invention, the waveguide is formed in a rib/ridge shape as shown in the figure. In addition, with the structure in which the doping density is increased, it is possible to obtain an electro-optic modulator operating at high speed, which has a small light loss and a small RC time constant. Moreover, it is also possible to suppress the excitation of the high-order light propagation mode, which occurs when the first contact region having the same height to the rib waveguide is brought close to the rib waveguide structure.

The second semiconductor layer 5 includes a second contact region 7 doped with the second type of conductivity (n+) at high concentration. These semiconductor layers are covered with an oxide clad 8 that is an upper clad and forms a light confinement structure with the BOX layer 2 that is the lower clad. The illustrated electro-optic modulator includes a first electrode 9 connected to the first contact region 6 and a second electrode 10 connected to the second contact region 7. Note that, in FIGS. 1 and 2 and FIGS. 6 to 9 described later, the same reference numerals as in FIG. 3 indicate equivalent configurations.

The electro-optic modulator shown in FIG. 3 is similar in structure to the conventional structure as shown in FIG. 2, but the width W of the SIS junction, which is constituted by the first semiconductor layer 4, the second semiconductor layer 5 and the relatively thin dielectric layer 11 formed at the interface of both semiconductor layers, is formed smaller than that of FIG. 2. Further, the present invention is characterized in that, the light incident on the SIS junction is a light having a polarization component in the direction orthogonal to the width direction (horizontal direction of the paper surface) of the SIS junction, as shown by arrow of reference numeral 12 in FIG. 3.

Conventionally, in a silicon-based electro-optic modulator having SIS structure, a light having a polarization component in the direction parallel to the width direction of the SIS junction is incident on the SIS junction. For example, TE (transverse electric) mode light having a polarization component in the direction parallel to the width direction of the SIS junction, where the width is oriented in the direction parallel to the surface of the SOI substrate as shown in FIGS. 1 and 2, is incident on the SIS junction. In that case, when reducing the width of the SIS junction, the electro-optic modulator would not be practical due to the reduction in light modulation efficiency. Therefore, when the wavelength of the incident light is $\lambda$ and the effective refractive index to the incident light is $n_{eff}$, the width of the SIS junction is generally $\lambda/n_{eff}$ or more.

By contrast, the present inventors have found that when light having a polarization component orthogonal to the width direction of the SIS junction is used as the incident light, the light modulation efficiency does not easily decrease even if the width of the SIS junction is set to $\lambda/n_{eff}$ or less. In addition, because of narrowing the width of the SIS junction, the first contact region 6 formed adjacent to the first semiconductor layer 4 constituting the SIS junction is brought closer by an amount corresponding to the narrowed width of the SIS junction. It becomes possible to reduce the lead-out resistance from the semiconductor layer to the electrode. The width of the SIS junction is more preferably $\lambda/n_{eff}$ or less. That is, it is possible to obtain a sufficient modulation efficiency even reducing the width of the SIS junction to half or less of the width of the conventional SIS junction. The electro-optic modulator of the present invention can realize power reduction of ½ or less and wide bandwidth of 2 times or more while maintaining the modulation efficiency as compared with the electro-optic modulator having the conventional SIS junction structure. Furthermore, in the present invention, it is possible to realize an electro-optic modulator capable of high-speed operation with low resistance and low electric capacity by reducing the electrode lead-out resistance.

At this time, it is preferable that the light having a polarization component orthogonal to the width direction of the SIS junction is light of a slot mode formed by an optical mode converter on the input side (referred to as a first optical mode converter). In the first optical mode converter, light other than the slot mode can be converted to light in the slot mode and be incident on the electro-optic modulator. By injecting the light of the slot mode into the electro-optic modulator, it is possible to realize relatively high modulation efficiency even if the width of the SIS junction is set to $\lambda/n_{eff}$ or less.

The light modulated by the electro-optical modulator in the present example embodiment is preferably converted to the same mode of the light before converting in the first optical mode converter by another optical mode converter (second optical mode converter) coupled to the output side of the electro-optical modulator. That is, the light of the slot mode modulated in the electro-optical modulator is returned to the light other than the slot mode and output. According to such a mode conversion, the polarization direction in the optical circuit integrated the electro-optic modulators can be unified with the lights input to and output from the electro-optic modulator, and it is possible to realize a highly integrated optical circuit with small optical loss in an optical power branching device and an optical coupler.

These first and second optical mode converters are preferably formed on the same substrate on which the electro-optic modulator of the present example embodiment is formed in viewpoint of reduction in optical loss. For example, in the case that the direction of the SIS junction width is oriented in the direction parallel to the substrate surface as shown in FIG. 3, a TE mode (TE0) having substantially unimodal power density is incident on the input side of the first optical mode converter, and the modulated light is output by converting to a transverse magnetic field (a zeroth order TM (transverse magnetic): TM0) mode having a substantially unimodal power density. This facilitates optical coupling with the optical mode output in the TE mode which is the oscillation mode of the laser diode and the optical waveguide propagating in the TE mode coupled with the laser diode.

Such an optical mode converter converting TE0 mode to TM0 mode at one stage has a complicate structure and therefore, the converter is preferably constituted in two parts: one part converts the TE0 mode light once injected to a TE1 mode light having a substantially bimodal power density distribution, and the other part converts the TE1 mode light to the TM0 mode light.

Figure 4A:
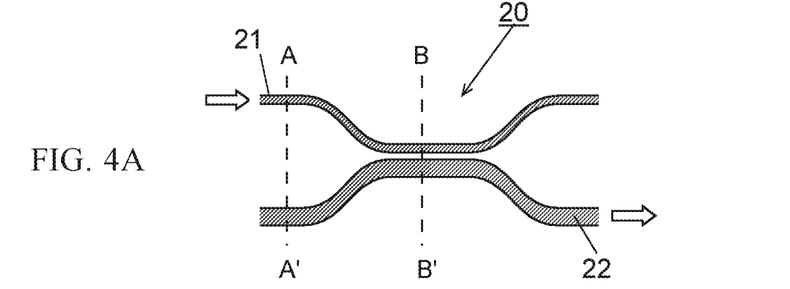
FIG. 4A to 4C are schematic views of a structure example of converting TE0 mode into TE1 mode in a first mode convertor of the present invention.
Figure 4B:
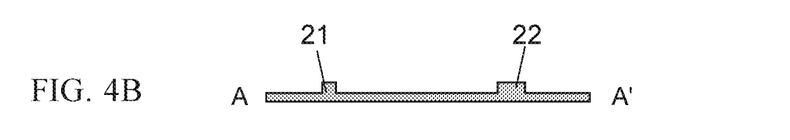
Figure 4C:
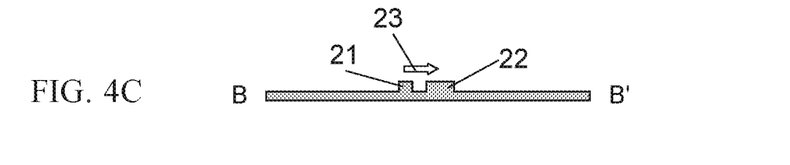

To convert the TE0 mode light to the TE1 mode light, a directional coupler 20 in which two optical waveguides having different widths are arranged in parallel as shown in FIG. 4 is applicable. FIG. 4A is a plane view; FIG. 4B is a cross-sectional view at A-A' line of FIG. 4A; and FIG. 4C is a cross-sectional view at B-B' line of FIG. 4A. The directional coupler shown in FIG. 4 includes a TE0 waveguide 21 having narrower width and a TE1 waveguide 22 having wider width. The TE0 waveguide 21 and the TE1 waveguide 22 are arranged apart from each other at the input side as shown in FIG. 4B, but the light 23 exudes from the TE0 waveguide 21 to the TE1 waveguide 22 in a portion where both waveguides are arranged in proximity to each other, and the order conversion can be performed by optimizing the widths of both waveguides. Both waveguides 21 and 22 can be formed by the first semiconductor on the SOI substrate when they are provided on the same substrate on which the electro-optic modulator of the present example embodiment is formed.

Figure 5A:
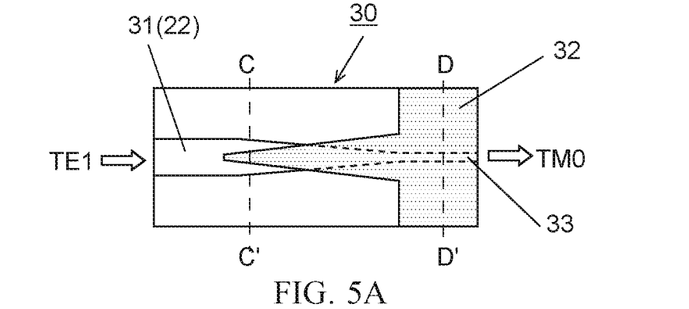
FIG. 5A to 5C are schematic views of a structure example of converting TE1 mode into TE0 mode in a first mode convertor of the present invention.
Figures 5B, 5C:
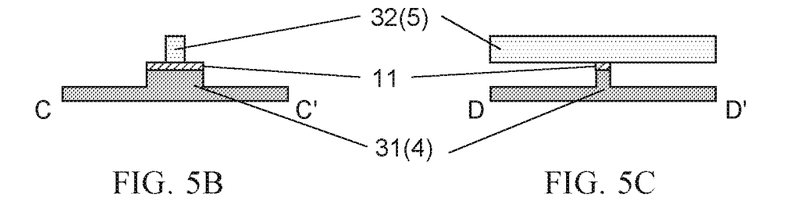

To convert the TE1 mode light having a substantially bimodal power density distribution to the TM0 mode light, a mode conversion part 30 shown in FIG. 5 is used. FIG. 5A is a plane view; FIG. 5B is a cross-sectional view at C-C' line of FIG. 5A; and FIG. 5C is a cross-sectional view at D-D' line of FIG. 5A. As shown in these figures, a waveguide 31 having tapered shape is effectively usable. The waveguide 31 can be formed by extending the TE1 waveguide 22 shown in FIG. 4 and can be used as the first semiconductor layer 4. The mode conversion part 30 is effectively employing structures including an upper layer 32 formed from the second semiconductor layer 5 having a tapered shape that spreads in the opposite direction to the tapered shape of the waveguide 31 (the first semiconductor layer 4) and the relatively thin dielectric layer 11 provided therebetween so that the light converted into the TM0 mode is directly incident on the electro-optic modulator according to the present embodiment. The tapered tip 33 of the waveguide 31 can be narrowed to the width W of the SIS junction in the electro-optic modulator according to the present example embodiment.

In the electro-optic modulator can generate the TM0 mode light localized in the relatively thin dielectric layer. The localized light is called as the slot mode. In this case, the direction of the electric field of the TM0 mode light is designed to be orthogonal to the direction of the SIS junction width. According to such a design, the electro-optic modulator of the present example embodiment can obtain relatively higher modulation efficiency even in the case that the width W of the SIS junction and the electric capacity are reduced. It is possible to realize an electro-optical modulator having high efficiency and low power consumption and applicable to wide bands.

On the other hand, the second optical mode converter has a reverse structure of the first optical mode converter. That is, the optical signal of the TM0 mode modulated by the electro-optic modulator according to the present example embodiment is converted to the TE1 mode by the reverse configuration of FIG. 5, and the optical signal of the TE1 mode is further converted from the TE1 waveguide 22 to the TE0 waveguide 21 that is configured by the reverse configuration of FIG. 4 so as to take out the light of the TE0 mode on the output side.

In this example embodiment, the relatively thin dielectric layer 11 located in the interface of the stacked portion of the first semiconductor layer 4 and the second semiconductor layer 5 can be selected from an inorganic material having lower refractive index than those of the first and second semiconductor layers. Examples of the inorganic material include one kind selected from silicon oxide, silicon nitride, hafnium oxide, zirconium oxide, oxides of rare earth metals and ferroelectric film having electro-optical effect, or mixed layers and stacked layers composed of at least two kinds thereof. The thickness of the dielectric layer 11 is not particularly limited, but is preferably about 1 to 10 nm as a $SiO_2$ equivalent film thickness.

When using a ferroelectric layer having an electro-optic effect, the sign of the change in refractive index in the first or second semiconductor layer and the change in refractive index due to the Pockels effect of the ferroelectric layer become opposite when voltage is applied. It is preferable to select the thickness of the ferroelectric layer and the material configuration so that the refractive index change due to the Pockels effect of the ferroelectric layer becomes larger.

In addition, in the present example embodiment, each of the first and second semiconductor layers can be a layer formed of at least one layer selected from the group consisting of polycrystalline silicon, strained silicon, single crystal silicon, $Si_{1-x}Ge_x$ and compound semiconductors.

In addition, the crystal orientation of the first or second semiconductor layer is preferably selected to be a crystal orientation with a small effective mass of free carriers in a direction parallel to the optical mode electric field direction having a polarization component orthogonal to the width direction of the SIS junction. This makes it possible to realize greater optical modulation efficiency.

Further, in the present example embodiment, the electrodes (electrical terminals) formed in the first and second contact region can be arranged to reduce an optical signal loss, and to provide a low series resistance.

The following description describes the operation of the electro-optic modulator according to the invention as an overview of the modulation mechanism in the semiconductor layer based thereon. Several of example embodiments illustrated in the drawings are related with a modulation structure, and the electro-optic modulator of the present invention is a modulator that utilizes an electro-optic effect (free carrier plasma effect) described below.

Because a pure electro-optic effect is not present or is very weak in silicon, only a free carrier plasma effect or a thermo-optic effect can be used for optical modulation operation. For high-speed operation (Gb/second or greater) that is aimed at in the present invention, only the free carrier plasma effect is effective, and the effect is described by the following relations in first order approximation.

$$\Delta n = -\frac{e^2 \lambda^2}{8\pi^3 c^3 \varepsilon_0 n} \left( \frac{\Delta N_e}{m_e} + \frac{\Delta N_h}{m_h} \right) \quad (1)$$

$$\Delta k = -\frac{e^3 \lambda^2}{8\pi^3 c^3 \varepsilon_0 n} \left( \frac{\Delta N_e}{m_e^2 \mu_e} + \frac{\Delta N_h}{m_h^2 \mu_h} \right) \quad (2)$$

In the above expressions, $\Delta n$ and $\Delta k$ represent, respectively, the real and imaginary parts of a change in refractive index of a silicon layer, e represents the electron charge, $\lambda$ represents the optical wavelength, $\varepsilon_0$ represents the permittivity of free space, n represents the refractive index of intrinsic semiconductor silicon, $m_e$ represents the effective mass of electron carriers, $m_h$ represents the effective mass of hole carriers, $\mu_e$ represents the mobility of electron carriers, $\mu_h$ represents the mobility of hole carriers, $\Delta N_e$ represents a change in electron carrier concentration, and $\Delta N_h$ represents a change in hole carrier concentration. That is, it is considered that decreasing the effective mass of hole carriers that are free carriers is an effective means for improving the free carrier plasma effect.

Experimental evaluations of the electro-optic effect in silicon have been performed, where it has been found that changes in the refractive index as a function of the carrier density at the 1310 and 1550 nm wavelengths used in optical communication systems agree well with the Drude expression. In an electro-optic modulator using the effect, the phase change amount Δθ is defined by the following expression (3).

$$\Delta\theta = \frac{2\pi}{\lambda}\Delta n_{\mathit{eff}} L \qquad (3)$$

In expression (3), L represents the length of the active layer in the direction of light propagation in the electro-optic modulator. $\Delta n_{\mathit{eff}}$ represents the amount of change in the effective refractive index.

In the present invention, the above-described phase change amount is a larger effect compared to optical absorption, which enables an electro-optic modulator described below to exhibit a feature essentially as a phase modulator.

In the above example embodiment, the structure shown in FIG. 3 has been described as an example of the electro-optic modulator. However, the present invention is not limited to this example embodiment, and the following example embodiments can be exemplified.

Figure 6:
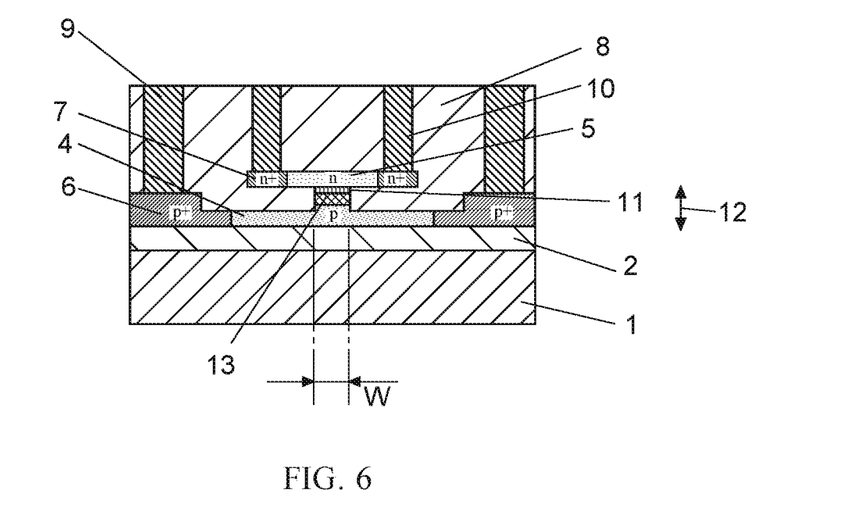
FIG. 6 is a cross-sectional view of an electro-optic modulator according to one example embodiment of the present invention.

In the structure according to another example embodiment of the present invention shown in FIG. 6, in addition to the configuration of FIG. 3, the rib waveguide portion of the first semiconductor layer (p-type Si layer) 4 among the two semiconductor layers forming the SIS junction is partially changed to $Si_{1-x}Ge_x$ (0<x≤0.9, preferably 0.01≤x≤0.9) layer (hereinafter, SiGe layer) 13 having the same conductivity type (p-type). The strain stress is applied to the first semiconductor layer 4 by the stacking process. The SiGe layer 13 can also be a stacked structure of layers different in Ge concentration. At this time, there is an improving effect of the modulation efficiency even if the thickness of the SiGe layer 13 formed at the rib upper region exceeds two times with respect to the maximum thickness Xd of the depletion layer of the semiconductor layer in which the free carriers are accumulated, removed, or inverted on both sides of the dielectric layer 11, the thickness of the SiGe layer 13 is preferably two times or less with respect to the maximum thickness Xd.

A maximum thickness Xd of the depletion layer is given by the following expression (4) in the thermal equilibrium state:

$$Xd = 2\sqrt{\frac{\epsilon_s kT \ln\left(\frac{N_c}{n_i}\right)}{e^2 N_c}} \qquad (4)$$

In expression (4), $\epsilon_s$ is the permittivity of the semiconductor layer, k the Boltzman constant, $N_c$ the carrier density, $n_i$ the intrinsic carrier concentration, and e is the electron charge. For example, the maximum depletion layer thickness is about 0.1 μm when $N_c$ is $10^{17}/cm^3$, and with an increase in the carrier density, the depletion layer thickness, that is, the thickness of a region in which carrier density modulation occurs is decreased. Therefore, the SiGe layer 13 is preferably formed in the thickness of 0.2 μm or less.

Figure 7:
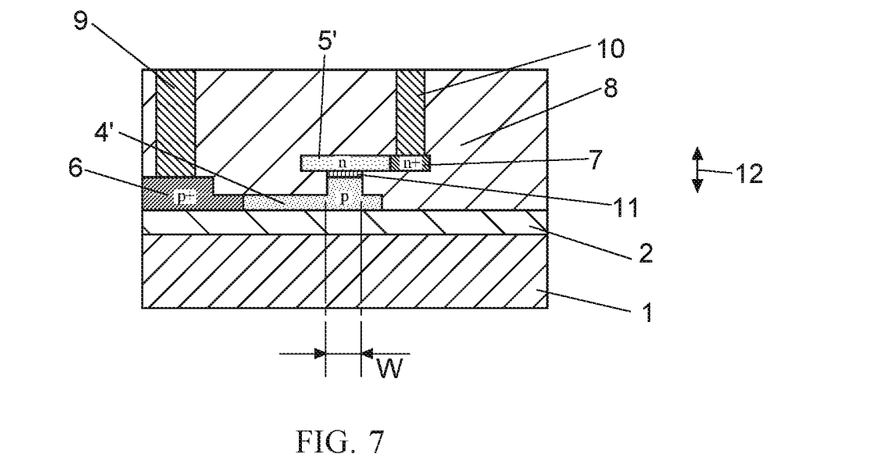
FIG. 7 is a cross-sectional view of an electro-optic modulator according to one example embodiment of the present invention.
Figure 8:
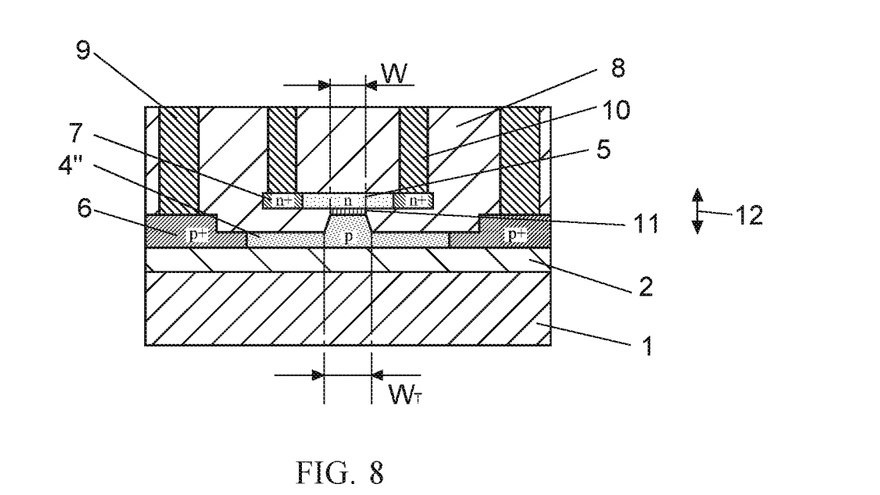
FIG. 8 is a cross-sectional view of an electro-optic modulator according to one example embodiment of the present invention.

In addition, in further another example embodiment, it is possible to form a right-left asymmetric SIS junction structure as shown in FIG. 7. In FIG. 7, the first contact region 6 is formed at one side (left side on the paper) with respect to a first semiconductor layer 4' and the second contact region 7 is formed at the opposite side (right side on the paper) to the formed side of the first contact region 6 with respect to a second semiconductor layer 5'. Alternatively, a first semiconductor layer 4" can be formed in a taper shape as shown in FIG. 8, i.e., the width $W_T$ of the bottom portion of the rib waveguide structure is wider that the width W of the SIS junction. In this example embodiment, the first semiconductor layer 4" is formed in a rib waveguide structure in a direction parallel to the mode direction of the electric field of light having a polarization component orthogonal to the width direction of the SIS junction (i.e., parallel to the width direction of the SIS junction). These structures reduce parasitic capacitance and allow for higher speed operation. In addition, a part of the second semiconductor layer 5 may be extended in a tapered shape upward from the contact surface with the dielectric layer 11. That is, the first or second semiconductor layer can be tapered in the direction perpendicular to the relatively thin dielectric layer. This makes it possible to reduce the parasitic capacitance in the SIS junction and to confine the optical mode field more efficiently in the first or second semiconductor layer.

In the above example embodiments, a silicon-based semiconductor has been described as the first and second semiconductor layers, but as the second semiconductor layer to be stacked on the first semiconductor layer 4 via the dielectric layer 11, A III-V compound semiconductor layer such as InGaAsP can also be used. By using such a compound semiconductor layer as the second semiconductor layer, it is possible to reduce the increase in light loss as well as to improve the light modulation efficiency.

Next, a method for manufacturing the electro-optic modulator of one example embodiment will be described by using the asymmetric SIS junction structure shown in FIG. 7. FIGS. 9A-9I are multiple view drawings that include cross-sectional views of an example of a method for forming a waveguide structure including the SIS junction shown in FIG. 7.

Figure 9A:
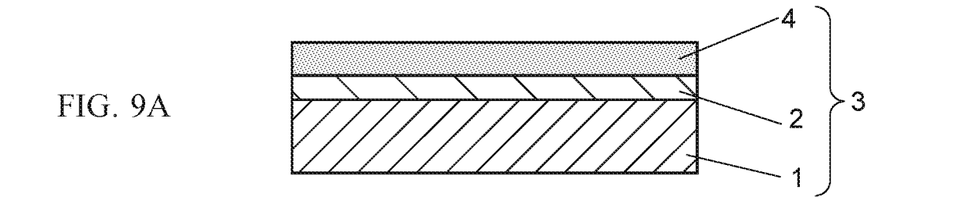
FIGS. 9A to 9I are cross-sectional views illustrating manufacturing processes of the electro-optic modulator according to one example embodiment of the present invention.

FIG. 9A (step a) shows a cross-sectional view illustrating processes with respect to an SOI substrate used for forming the electro-optic modulator of the present example embodiment. The SOI substrate includes a structure in which semiconductor layer (Si layer) 4 having a thickness of around 100 to 1000 nm is stacked on buried oxide layer 2 and support substrate 1, and in the present case a structure having buried oxide layer 2 with a thickness of 1000 nm or greater is adopted for reducing optical loss. Buried oxide layer 2 functions as a lower clad layer of the waveguide structure. Si layer on buried oxide layer 2 can be formed using a substrate doped in advance to exhibit the first type of conductivity (e.g., p-type), or it can be doped with phosphorus (P: n-type) or boron (B: p-type) in its surface layer by ion implantation or the like and subsequently annealed.

Figure 9B:
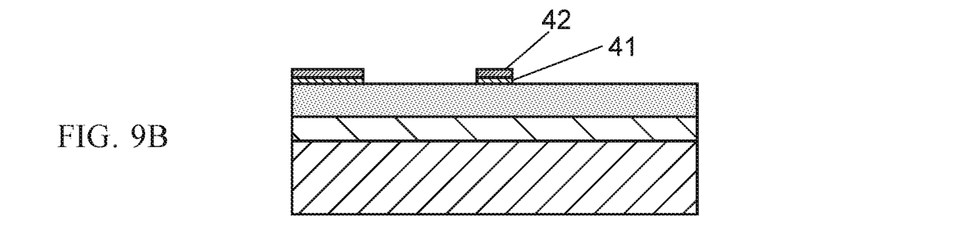

Next, as shown in FIG. 9B (step b), a stacked structure including a silicon oxide film and a $SiN_x$ layer is formed as a mask for forming the rib waveguide shape, and then patterning to an oxide mask 41 and a hard mask 42 is performed by UV lithography and a dry etching method. At this time, oxide film mask 41 and hard mask 42 are also similarly formed on semiconductor regions that serve as the first contact region 6.

Figure 9C:
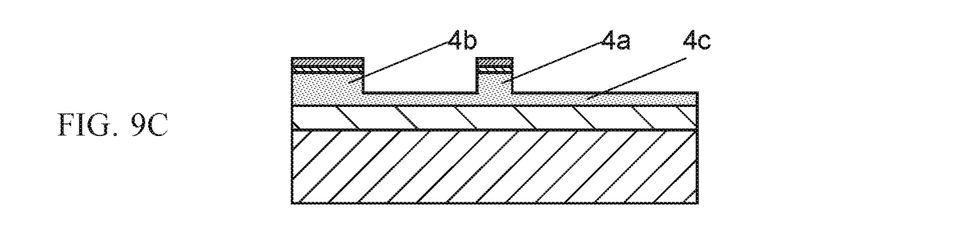

Next, as shown in FIG. 9C (step c), patterning of the first semiconductor layer 4 is performed taking the oxide mask 41 and hard mask 42 as masks, to form a rib waveguide structure 4a. The portion 4b to be formed for the first contact region 6 is left and the other portion becomes slab region 4c. Also, at this time, silicon waveguide parts constituting the first and second optical mode converters that convert the TE0 mode light input to the electro-optic modulator into the TE1 mode and further convert it into the TM0 mode are also formed by patterning on the same SOI substrate. Furthermore, the portions 4a and 4b and the slab region 4c between 4a and 4b are protected by an etching mask (not shown), and a part of the exposed slab region 4c is removed.

Figure 9D:
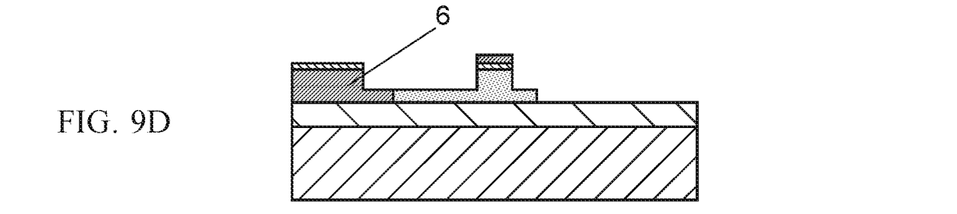

Next, as shown in FIG. 9D (step d), the portion 4b to be formed for the first contact region 6 and a part of slab region 4c adjacent to the portion 4b are heavily doped with an impurity, for example, boron (B), of the first type of conductivity by an ion implantation method or the like to thereby form first contact region 6.

Figure 9E:
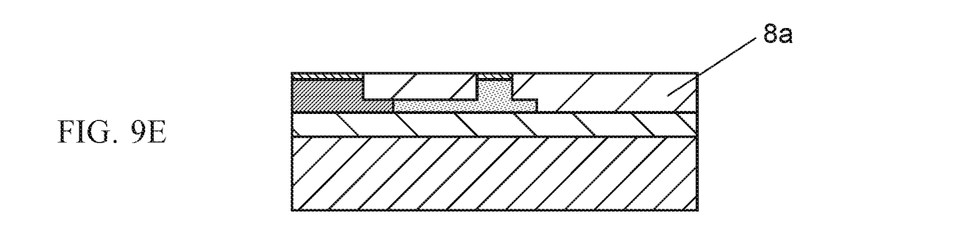

Thereafter, as shown in FIG. 9E (step e), oxide clad layer 8 is deposited, and then flattening is performed by a CMP (chemical mechanical polishing) method.

Figure 9F:
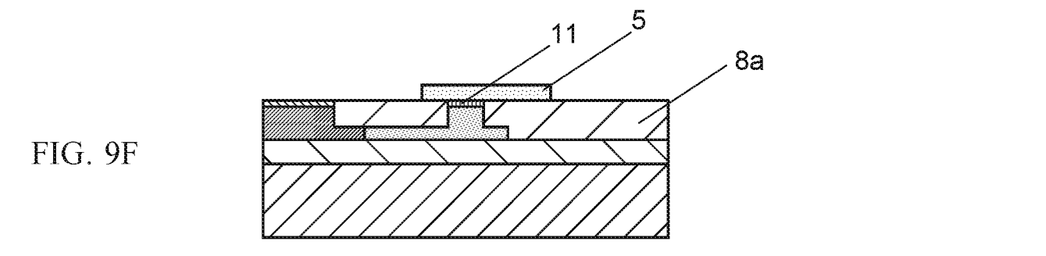

Next, as shown in FIG. 9F (step f), the remaining hard mask 42 and oxide mask 41 are removed by hot phosphoric acid and diluted fluoric acid processes or the like, and subsequently a relatively thin dielectric layer 11 of about 2 to 10 nm thickness is formed on a top portion of the rib waveguide structure. In addition, the dielectric layer 11 can be formed in the same manner in the silicon waveguide portions constituting the first and second optical mode converters. Examples of the method for forming the dielectric layer include known methods such as thermal oxidation, atomic layer deposition (ALD), and CVD.

Further, as the second semiconductor layer 5 that exhibits the second type of conductivity, n-doped polycrystalline silicon is stacked, is patterned to have a width sufficient to enable formation of the second contact region, by a dry etching method or the like. In addition, polycrystalline silicon constituting the upper layer 32 of the mode conversion portion 30 shown in FIG. 5 is also stacked and patterned by the dry etching method or the like.

Figure 9G:
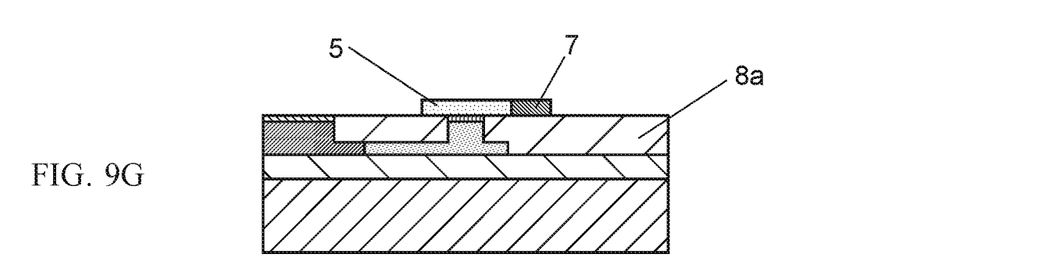

Thereafter, as shown in FIG. 9G (step g), portions of the second semiconductor layer 5 are heavily doped by an ion implantation method or the like with an impurity that exhibits the second type of conductivity, for example, phosphorus (P), to form the second contact region 7.

Figure 9H:
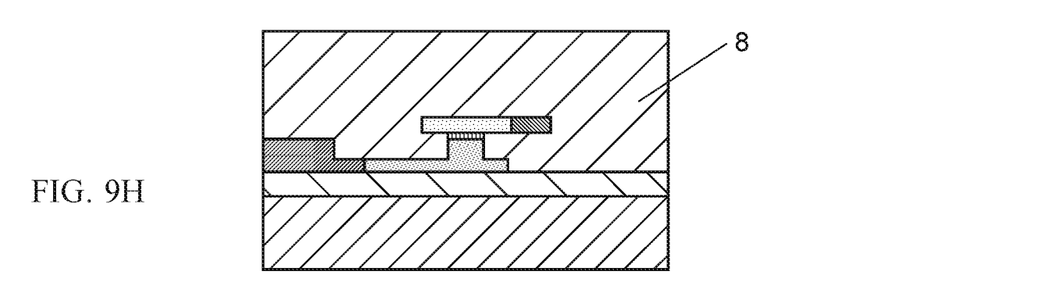
Figure 9I:
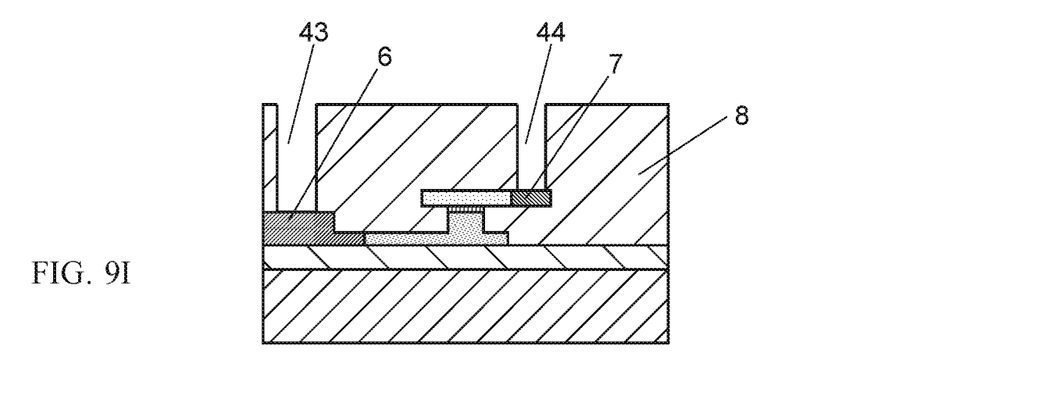

Next, as shown in FIG. 9H (step h), an about 1 μm thick additional portion of the oxide clad layer 8 is stacked, and as shown in FIG. 9I (step i), then contact holes 43 and 44 for obtaining connections to the first contact region 6 and the second contact region 7 are formed by a dry etching method or the like.

Finally, by forming a metal layer of Ti/TiN/Al (Cu) or Ti/TiN/W within the contact holes 43 and 44 by a sputtering method or a CVD method and then patterning it by a reactive etching, a first electrode 9 connected to the first contact region 6 and a second electrode 10 connected to the second contact region 7 are formed, and the electro-optic modulator having the structure shown in FIG. 7 is then completed by making a connection between the first and second contact regions and a driving circuit (not shown).

Next, the effects of the present invention will be described.

Figure 10:
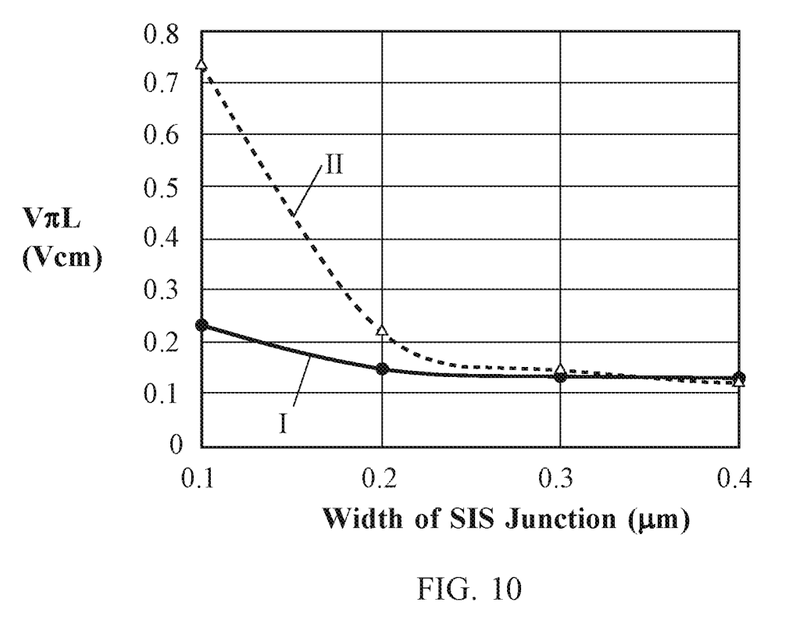
FIG. 10 is a graph which compared the waveguide width dependence of the optical modulation efficiency of the electro-optic modulator according to one example embodiment of the present invention and the conventional electro-optic modulator.

FIG. 10 shows a graph that demonstrates the dependency of the optical modulation efficiency (VπL) with respect to the width of the SIS junction in the case of employing 2-nm $SiO_2$ as the relatively thin dielectric layer in the SIS junction type electro-optic modulator. Line I indicates the case using TM0 mode light that is a slot mode light of the present invention and Line II indicates the case using conventional TE0 mode light. At this time, the performance index of optical modulation efficiency, VπL, has a smaller value when the modulation efficiency is high. In addition, the width of SIS junction is identical to the width of the waveguide. When the width of SIS junction is 0.4 μm, the width corresponds to $\lambda/n_{eff}$. In practically, since the effective refractive index $n_{eff}$ is about 2.8 when λ is 1.31 μm, $\lambda/n_{eff}$ becomes about 468 nm. When using TM0 mode light (Line I) according to the present invention, it can be seen that the relatively high modulation efficiency can be obtained even if reducing the width of the waveguide. If the width of the conventional waveguide is 0.4 μm, at 0.2 μm, which is half of the conventional width, it can be confirmed a clear difference in modulation efficiency between the present invention (Line I) and the conventional example (Line II). Further, if the width is smaller than 0.2 μm, it can be seen that in the present invention, the modulation efficiency is reduced with a slight decrease, while in the conventional example, it is greatly reduced. As described above, in the electro-optical modulator according to the present invention, the electric capacity can be significantly reduced, and low power consumption and wide band can be realized.

Figure 11:
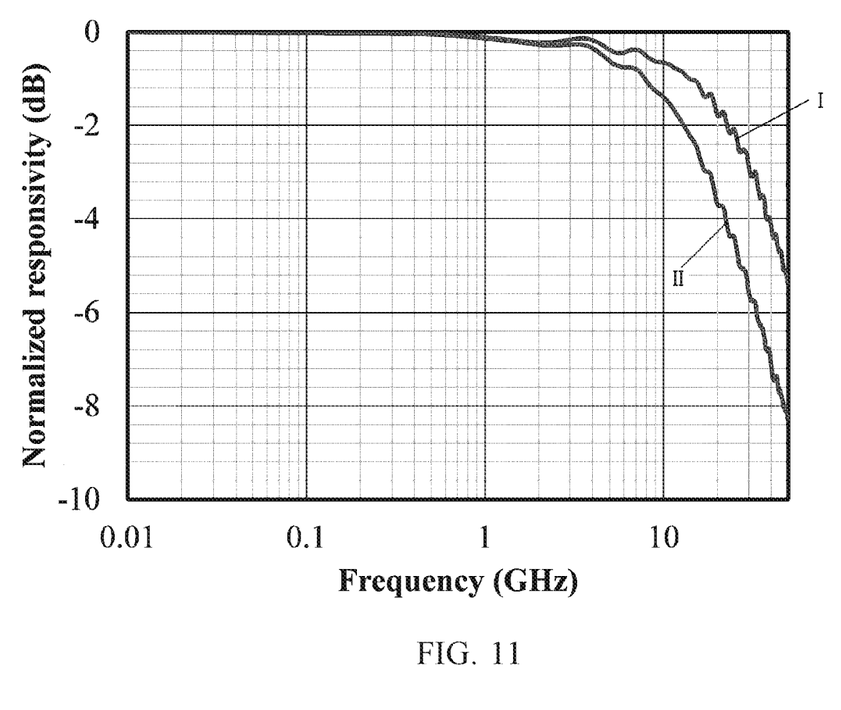
FIG. 11 is a graph which compared the frequency dependence of the optical modulation characteristic of the electro-optic modulator according to one example embodiment of the present invention and the conventional electro-optic modulator.

FIG. 11 shows optical modulation frequency characteristics in electro-optic modulators of the present invention and the conventional art. Line I shows the result when the width of the waveguide is 0.2 μm with the slot mode, while line II shows the result when the width of the waveguide is 0.4 μm with conventional TE mode. By reducing the width of the waveguide to half the conventional one and further reducing the series resistance by bringing the electrode closer to the rib part, the RC time constant is reduced, and a frequency band of about 30 GHz, which is broader than in the conventional type, can be obtained.

In addition to the above, carrier mobility is very important to improve the frequency band. In particular, the mobility of carriers in the polycrystalline silicon layer used as the second semiconductor layer is given as a problem in high-speed operation. Therefore, it is valid to improve the carrier mobility by increasing the grain size by recrystallization with annealing treatment, or improve the crystal quality of the second semiconductor layer using epitaxial lateral overgrowth (ELO) or the like.

When a compound semiconductor layer is used as the second semiconductor layer, a relatively thin dielectric layer is formed on the first semiconductor layer such as a silicon semiconductor layer, and the compound semiconductor layer is then attached as the second semiconductor layer. In addition, after forming an electrode layer after etching processing by a lithography process, a highly efficient and high-speed electro-optic modulator can be realized.

Figure 12:
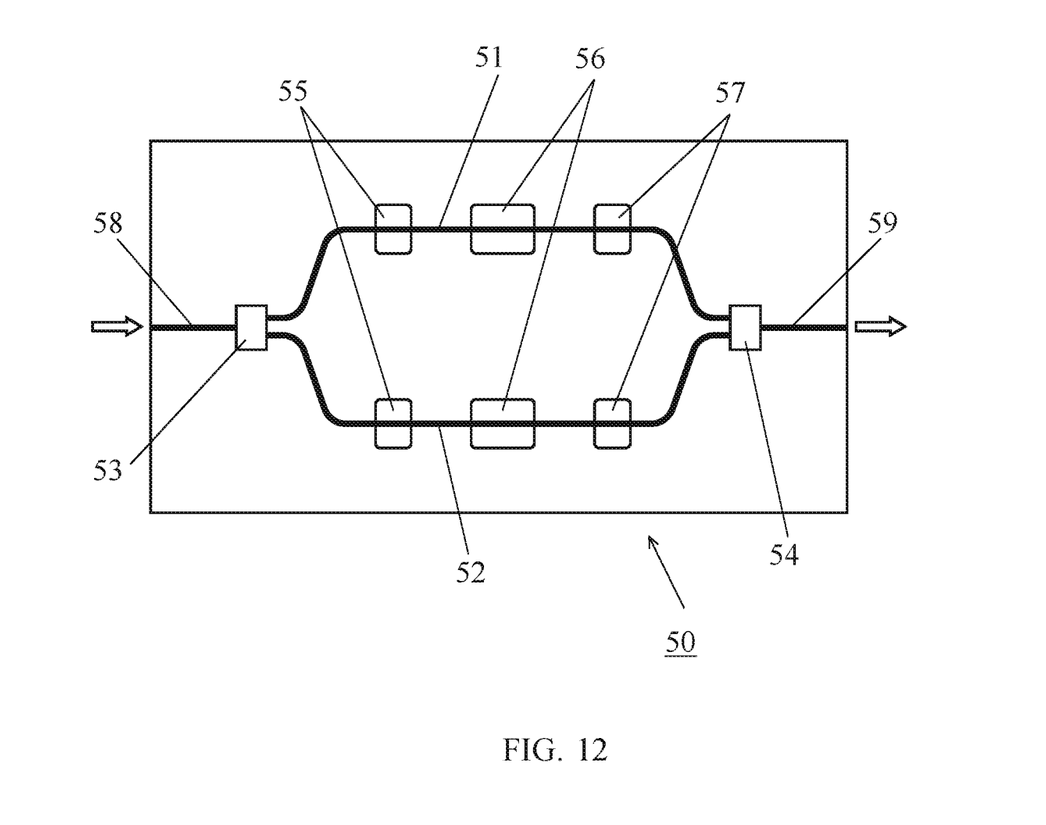
FIG. 12 is a schematic diagram illustrating an example embodiment of a Mach-Zehnder interferometer-type optical intensity modulation device using the electro-optic modulator of the present invention.

FIG. 12 is a schematic diagram illustrating an example embodiment of a Mach-Zehnder interferometer-type optical intensity modulation device 50 as an application example of the electro-optic modulator of the present invention. In this figure, the electro-optic modulator of the present invention can be used as each phase modulating portion 56 of a first arm 51 and a second arm 52, which are arranged in parallel, an input TE0 mode light is converted to a TE1 mode light by a first optical mode converter 55, and the TE1 mode light further is converted to TM0 mode light in the SIS junction portion to be optically coupled with the electro-optic modulator composed of the SIS junction. In the output portion of the electro-optic modulator, the output light is converted to TE0 mode light in a second optical mode converter 57. The input light in the optical intensity modulation device 50 is branched from a waveguide 58 to the first arm 51 and the second arm 52 by the light branching structure 53 coupled thereto at the input side so as to have equal power. Phase modulation of the optical signal is performed at the first arm 51 and the second arm 52, and phase interference is performed by the optical coupling structure 54 at the output side so that the optical signal is converted to an optical intensity modulation signal and output from a waveguide 59.

In this case, by applying a positive bias voltage to first arm 51, carrier accumulation is generated on each side of the relatively thin dielectric layer of the SIS junction, and by applying a negative bias voltage to second arm 52, carriers on each side of the relatively thin dielectric layer are removed. As a result, the refractive index felt by an optical signal electric field in the electro-optic modulator is decreased in a carrier accumulation mode, and is increased in a carrier removal (depletion) mode, and accordingly, the optical signal phase difference between both arms is maximized. By converting the optical signals transmitted through to TE0 mode output light by the second optical mode converter 57 on the output side, and combining by means of light combining structure 54, optical intensity modulation (an optical intensity modulated signal) is generated. The capability of the optical intensity modulation device 50 to transmit optical signals of 40 Gbps or greater has been confirmed.

Further, the optical intensity modulation device 50 including a Mach-Zehnder interferometer can be applied also to a modulator device such as an electro-optic modulator that has a higher transfer rate and a matrix optical switch, by arranging a plurality of the devices in parallel or in series.

Although the present invention has been described above referring to example embodiments, the present invention is not limited to the above-described example embodiments. Various changes that can be understood by one skilled in the art can be made to the configuration and details of the present invention within the scope of the present invention.

SUPPLEMENTARY NOTE

The whole or part of the example embodiments disclosed above can be described as, but not limited to, the following supplementary notes:

(Supplementary Note 1)

An electro-optic modulator comprising:

a first semiconductor layer doped to exhibit a first type of conductivity;

a second semiconductor layer doped to exhibit a second type of conductivity, at least part of the second semiconductor layer being stacked over the first semiconductor layer; and a dielectric layer disposed in the interface between the stacked semiconductor layers to form a SIS (semiconductor-insulator-semiconductor) junction, wherein an electrical signal from electrodes coupled to the first and second semiconductor layers causes free carriers accumulate, deplete or invert on both sides of the dielectric layer in the SIS junction, thereby modulating a free carrier concentration felt by an optical signal electric filed, wherein light having a polarization component orthogonal to the width direction of the SIS junction is incident on the dielectric layer, and wherein the width of the SIS junction is $\lambda/n_{\mathit{eff}}$ or less, where $\lambda$ is the wavelength of the light incident of the dielectric layer and $n_{\mathit{eff}}$ is an effective refractive index of the electro-optic modulator to the light incident on the dielectric layer.

(Supplementary Note 2)

The electro-optic modulator according to Supplementary Note 1, wherein the width of the SIS junction is $\lambda/2n_{\mathit{eff}}$ or less.

(Supplementary Note 3)

The electro-optic modulator according to Supplementary Note 1 or 2, wherein the light incident on the dielectric layer is a slot mode light localized in the dielectric layer, and the electro-optic modulator further comprises a first optical mode converter for converting light other than the slot mode to the slot mode light on the input side of the electro-optic modulator.

(Supplementary Note 4)

The electro-optic modulator according to Supplementary Note 3, further comprising a second optical mode converter for converting the slot mode light to light other than the slot mode on the output side of the electro-optic modulator.

(Supplementary Note 5)

The electro-optic modulator according to Supplementary Note 3 or 4, wherein the width direction of the SIS junction is a direction parallel to a surface of a substrate supporting the first semiconductor layer, and wherein the slot mode light is light of a zeroth order transverse magnetic field (TM0) mode and the light other than the slot mode is light of a zeroth order transverse electric field (TE0) mode.

(Supplementary Note 6)

The electro-optic modulator according to any one of Supplementary Notes 1 to 5, further comprising: a first contact region electrically connected to the first semiconductor layer and highly doped to exhibit a first type of conductivity; and a second contact region electrically connected to the second semiconductor layer and highly doped to exhibit a second type of conductivity, wherein the electrodes coupled to the first and second semiconductor layers are first and second electrodes connected to the first and second contact regions, respectively.

(Supplementary Note 7)

The electro-optic modulator according to Supplementary Note 6, wherein the first semiconductor layer has a rig waveguide structure and the dielectric layer is provided on the upper portion of the rig waveguide structure.

(Supplementary Note 8)

The electro-optic modulator according to Supplementary Note 7, wherein the first contact region is provided at the same height as the height of the rib waveguide structure.

(Supplementary Note 9)

The electro-optic modulator according to any one of Supplementary Notes 1 to 8, wherein the first or second semiconductor layer has a portion extending in a taper shape from the width of the SIS junction in a direction orthogonal to the width direction of the SIS junction.

(Supplementary Note 10)

The electro-optic modulator according to any one of Supplementary Notes 1 to 9, wherein the dielectric layer comprises one kind selected from silicon oxide, silicon nitride, hafnium oxide, zirconium oxide, oxides of rare earth metals and ferroelectric film having electro-optical effect, or mixed layers and stacked layers composed of at least two kinds thereof.

(Supplementary Note 11)

The electro-optic modulator according to any one of Supplementary Notes 1 to 10, wherein the first and second semiconductor layers comprise at least one layer selected from the group consisting of polycrystalline silicon, strained silicon, single crystal silicon, $Si_{1-x}Ge_x$ ($0<x\leq0.9$) and compound semiconductors.

(Supplementary Note 12)

The electro-optic modulator according to Supplementary Note 11, wherein the first semiconductor layer comprises a silicon layer and $Si_{1-x}Ge_x$ ($0<x\leq0.9$) layer interposed between the silicon layer and the dielectric layer.

(Supplementary Note 13)

The electro-optic modulator according to Supplementary Note 11 or 12, wherein the first semiconductor layer is a layer comprising silicon and the second semiconductor layer is a layer comprising the compound semiconductor.

(Supplementary Note 14)

The electro-optic modulator according to any one of Supplementary Notes 1 to 13, wherein the crystal orientation of the first or second semiconductor layer is selected to be a crystal orientation with a small effective mass of free carriers in a direction parallel to the direction of an optical mode electric field having a polarization component orthogonal to the width direction of the SIS junction.

(Supplementary Note 15)

The electro-optic modulator according to any one of Supplementary Notes 1 to 14, wherein the electro-optic modulator is formed on an SOI substrate, the first semiconductor layer is one semiconductor layer of the SOI substrate, a buried oxide layer of the SOI substrate is functioned as a lower clad, and wherein the electro-optic modulator further comprises an oxide clad covering the first and second semiconductor layers to form an upper clad.

(Supplementary Note 16)

A Mach-Zehnder interferometer, comprising: first and second arms arranged in parallel each other, an optical branching structure optically coupled to the first and second arms on the input side, an optical combining structure optically coupled to the first and second arms on the output side, wherein each of the first and second arms comprises the electro-optic modulator according to any one of Supplementary Notes 1 to 15.

What is claimed is:

1. An electro-optic modulator comprising:
   a first semiconductor layer doped to exhibit a first type of conductivity;
   a second semiconductor layer doped to exhibit a second type of conductivity, at least part of the second semiconductor layer being stacked over the first semiconductor layer; and
   a dielectric layer disposed in the interface between the stacked semiconductor layers to form a SIS (semiconductor-insulator-semiconductor) junction,
   wherein an electrical signal from electrodes coupled to the first and second semiconductor layers causes free carriers accumulate, deplete or invert on both sides of the dielectric layer in the SIS junction, thereby modulating a free carrier concentration felt by an optical signal electric filed,
   wherein light having a polarization component orthogonal to the width direction of the SIS junction is incident on the dielectric layer, and
   wherein the width of the SIS junction is $\lambda/n_{eff}$ or less, where $\lambda$ is the wavelength of the light incident of the dielectric layer and $n_{eff}$ is an effective refractive index of the electro-optic modulator to the light incident on the dielectric layer.

2. The electro-optic modulator according to claim 1, wherein the width of the SIS junction is $\lambda/2n_{eff}$ or less.

3. The electro-optic modulator according to claim 1, wherein the light incident on the dielectric layer is a slot mode light localized in the dielectric layer, and the electro-optic modulator further comprises a first optical mode converter for converting light other than the slot mode to the slot mode light on the input side of the electro-optic modulator.

4. The electro-optic modulator according to claim 3, further comprising a second optical mode converter for converting the slot mode light to light other than the slot mode on the output side of the electro-optic modulator.

5. The electro-optic modulator according to claim 3, wherein the width direction of the SIS junction is a direction parallel to a surface of a substrate supporting the first semiconductor layer, and
   wherein the slot mode light is light of a zeroth order transverse magnetic field (TM0) mode and the light other than the slot mode is light of a zeroth order transverse electric field (TE0) mode.

6. The electro-optic modulator according to claim 1, further comprising:
   a first contact region electrically connected to the first semiconductor layer and highly doped to exhibit a first type of conductivity; and
   a second contact region electrically connected to the second semiconductor layer and highly doped to exhibit a second type of conductivity,
   wherein the electrodes coupled to the first and second semiconductor layers are first and second electrodes connected to the first and second contact regions, respectively.

7. The electro-optic modulator according to claim 6, wherein the first semiconductor layer has a rig waveguide structure and the dielectric layer is provided on the upper portion of the rig waveguide structure.

8. The electro-optic modulator according to claim 7, wherein the first contact region is provided at the same height as the height of the rib waveguide structure.

9. The electro-optic modulator according to claim 1, wherein the first or second semiconductor layer has a portion extending in a taper shape from the width of the SIS junction in a direction orthogonal to the width direction of the SIS junction.

10. The electro-optic modulator according to claim 1, wherein the dielectric layer comprises one kind selected from silicon oxide, silicon nitride, hafnium oxide, zirconium oxide, oxides of rare earth metals and ferroelectric film having electro-optical effect, or mixed layers and stacked layers composed of at least two kinds thereof.

11. The electro-optic modulator according to claim 1, wherein the first and second semiconductor layers comprise at least one layer selected from the group consisting of polycrystalline silicon, strained silicon, single crystal silicon, $Si_{1-x}Ge_x$ ($0<x\leq0.9$) and compound semiconductors.

12. The electro-optic modulator according to claim 11, wherein the first semiconductor layer comprises a silicon layer and $Si_{1-x}Ge_x$ ($0<x\leq0.9$) layer interposed between the silicon layer and the dielectric layer.

13. The electro-optic modulator according to claim 11, wherein the first semiconductor layer is a layer comprising silicon and the second semiconductor layer is a layer comprising the compound semiconductor.

14. The electro-optic modulator according to claim 1, wherein the crystal orientation of the first or second semiconductor layer is selected to be a crystal orientation with a small effective mass of free carriers in a direction parallel to the direction of an optical mode electric field having a polarization component orthogonal to the width direction of the SIS junction.

15. The electro-optic modulator according to claim 1, wherein the electro-optic modulator is formed on an SOI substrate, the first semiconductor layer is one semiconductor layer of the SOI substrate, a buried oxide layer of the SOI substrate is functioned as a lower clad, and wherein the electro-optic modulator further comprises an oxide clad covering the first and second semiconductor layers to form an upper clad.

16. A Mach-Zehnder interferometer, comprising:

first and second arms arranged in parallel each other, an optical branching structure optically coupled to the first and second arms on the input side, an optical combining structure optically coupled to the first and second arms on the output side, wherein each of the first and second arms comprises the electro-optic modulator according to claim 1.

* * * * *